(12) United States Patent
Müller et al.

(10) Patent No.: US 8,785,540 B2
(45) Date of Patent: Jul. 22, 2014

(54) VINYL ESTER COPOLYMER DISPERSIONS, THEIR PREPARATION AND USE

(75) Inventors: Harmin Müller, Hofheim (DE); Hans Uwe Faust, Liederbach (DE); Martin Schäfer, Landau I. D. Pfalz (DE)

(73) Assignee: Celanese Emulsions GmbH, Kronberg/TS. (DE)

( * ) Notice: Subject to any disclaimer, the term of this patent is extended or adjusted under 35 U.S.C. 154(b) by 807 days.

(21) Appl. No.: 11/835,102

(22) Filed: Aug. 7, 2007

(65) Prior Publication Data

US 2008/0039572 A1    Feb. 14, 2008

(30) Foreign Application Priority Data

Aug. 8, 2006 (DE) .................. 10 2006 037 317

(51) Int. Cl.
*C08K 3/20* (2006.01)

(52) U.S. Cl.
USPC ........... 524/457; 524/458; 524/459; 524/501; 524/503; 524/557

(58) Field of Classification Search
USPC .................. 524/457, 501, 503, 557
See application file for complete search history.

(56) References Cited

U.S. PATENT DOCUMENTS

| | | | |
|---|---|---|---|
| 6,576,698 | B1 | 6/2003 | Weitzel |
| 7,166,341 | B2 | 1/2007 | Heemann et al. |
| 2003/0125451 | A1* | 7/2003 | Weitzel et al. ............... 524/503 |
| 2005/0255249 | A1 | 11/2005 | Schlatterbeck et al. |

FOREIGN PATENT DOCUMENTS

| | | |
|---|---|---|
| DE | 4435423 A1 | 4/1996 |
| DE | 19650831 A1 | 6/1998 |
| DE | 19962566 A1 | 7/2001 |
| DE | 10224128 A1 | 12/2003 |
| EP | 0 050 548 | 4/1982 |
| EP | 0322175 A2 | 6/1989 |
| EP | 0420998 B1 | 4/1991 |
| EP | 0523589 B1 | 1/1993 |
| EP | 0621289 A1 | 10/1994 |
| EP | 1113031 A2 | 7/2001 |
| EP | 1287908 A2 | 3/2003 |
| EP | 1510529 A1 | 3/2005 |
| GB | 1438993 | 6/1976 |
| WO | WO-99/42504 A1 | 8/1999 |
| WO | WO-03/010256 A1 | 2/2003 |

* cited by examiner

*Primary Examiner* — Peter D Mulcahy
(74) *Attorney, Agent, or Firm* — Novak Druce Connolly Bove + Quigg LLP

(57) ABSTRACT

A description is given of an aqueous vinyl ester copolymer dispersion stabilized with a combination of at least one protective colloid and of at least one emulsifier, said dispersion having a viscosity of less than 8000 mPa*s, a weight average $d_w$ of the particle sizes of 0.5 to 10 μm, and a ratio of weight average to number average of the particle sizes, $d_w/d_n$, of at least 2.5, and the polymer possessing a glass transition temperature of between −30 and +15° C.

The dispersion can be used as an adhesive for nozzle application processes.

27 Claims, 2 Drawing Sheets

VINYL ESTER COPOLYMER DISPERSIONS, THEIR PREPARATION AND USE

RELATED APPLICATIONS

This application claims benefit of German application 10 2006 037 317.0, filed Aug. 8, 2006.

The present invention relates to new copolymer dispersions based on vinyl esters, possessing excellent suitability for the formulation of adhesives, to their preparation, and to the use of these dispersions in adhesives for nozzle application.

Dispersion-based adhesives for bonding paper in the production-line fabrication of folding boxes, envelopes, brochures or cigarettes are often applied to the substrate by means of a rotating segmented wheel, by means of a roller or by means of a nozzle application system.

With these modes of application, particularly in the case of the rotating segmented wheel and the roller, adhesive contamination caused by "splashing" or imprecise application of adhesive leads to problems in the fabrication process. If adhesive gets onto the conveyor belt, it can lead to instances of sticking of the fabricated material, leading in turn to machine downtime in conjunction with laborious cleaning work.

The use of nozzles is particularly advantageous, since first it is easily possible to adapt the geometry of the product to be bonded, and second it is possible to save on adhesive.

When an adhesive is applied by means of a nozzle application system, contamination comes about by virtue of the fact that, over the course of time, stalactites of dried adhesive form at the exit site of the nozzle and divert the jet of adhesive exiting the nozzle. The consequence is a high degree of variation in the precision of application. Variation in the precision of glue application leads consequently to contamination of the plant, or even to shutdown.

When an adhesive is applied by means of a nozzle application system, the adhesive is conveyed by means of a pump through a closed line system. Located at the end of the line system is a nozzle with a valve which opens and closes rapidly. Since the paper parts to be bonded are transported on a conveyor belt having a very high running speed, presently about 100 to 800 m/min, the valve is required to possess a short cycle time. If, for example, with a belt speed of 100 m/min, you wanted to apply dots at one dot/cm, then 166 dots are applied every second. The opening time of the valve in this case is therefore in the region <6 msec. At a belt speed of 250 m/s, 415 dots are applied every second, corresponding to an opening time of <2.5 ms.

Nozzle application systems having switching frequencies of up to 1000/second are nowadays state of the art. As a result of the high cycle frequency of the nozzle valves
- the adhesive inside the nozzle is exposed to extremely high shearing forces, and
- per unit time, within one hour, for example, over 1 000 000 individual drops are applied through one nozzle.

Owing to the high level of shearing of material and to the short time given for an individual drop to form by opening and closing of the valve, the formation of drops may be accompanied, at the exit of the nozzle, by formation of smaller individual drops, referred to as "satellite drops", whose high number at the exit of the nozzle gives rise over time to a stalactitic buildup of contamination (known as "dirt formation").

The question of how "clean" a drop is formed in the course of this extrusion process ought to be dependent on the physicochemical properties of the dispersion, such as, for example, its rheology, surface tension, shearing stability, yield point, and elasticity.

Described in the prior art are a number of processes for the application of adhesives from nozzles.

For instance EP-A-523,589 describes a process for applying adhesive dots by means of nozzles. This specification describes a selective application process and also a suitable apparatus for it. As regards the adhesives to be used, only general remarks are found—for example, the use of acrylate adhesives.

EP-A-621,289 describes the use of selected aqueous vinyl ester copolymer dispersions as adhesive bonding agents. These are emulsion polymers with 1-10% by weight of thermally crosslinkable comonomers. Typical copolymers are types based on vinyl acetate, ethylene, and N-methylolacrylamide. Nozzle application is described as one possible way of applying the adhesive to the substrate.

EP-A-1,113,031 discloses a process for the adhesive bonding of assembled paper sheets. Gluing can take place by means of nozzle application. The adhesive used is an aqueous dispersion of an anionic, modified polyurethane elastomer, such as a vinyl acetate-ethylene-polyurethane copolymer, for example.

DE-A-102 24 128 describes a selected process for the nozzle application of coatings to surfaces. Possible adhesives recommended are a very wide variety of types, examples being hotmelt adhesives, solution-based adhesives and dispersion-based adhesives.

EP-A-322,175 describes the emulsion polymerization of polyvinyl alcohol-stabilized vinyl esters together if desired with further comonomers, such as ethylene, acrylic acid or vinyl versatates, in the presence of selected, water-miscible chain transfer agents. The use of the products as adhesives is recommended, with one application method being nozzle application.

GB-A-1,438,993 discloses vinyl acetate-ethylene copolymers which are grafted with selected monomers. The products are recommended for use as hotmelt adhesives, solution-based adhesives and dispersion-based adhesives, with one application method being nozzle application.

EP-A-420,998 describes aqueous hotmelt adhesive suspensions or emulsions which derive from vinyl acetate and, if desired, further comonomers, such as ethylene, protective colloids, and emulsifiers, and which have been produced using a monomer-soluble initiator. These adhesives are suitable for spray application through nozzles.

WO-A-03/010,256 describes water-soluble or water-dispersible hotmelt adhesives which are prepared by graft copolymerization of selected olefinically unsaturated monomers, among them vinyl esters, onto polyalkylene oxides. One possible method of application recommended is nozzle application.

EP-A-1,287,908 describes aqueous polymer dispersions for spray application. These include, among others, emulsifier-stabilized or protective-colloid-stabilized polyvinyl acetate dispersions and ethylene-vinyl acetate copolymer dispersions. Further details regarding the adhesive systems are not disclosed.

EP-A-1,510,529 discloses a process for preparing multimodal polymer dispersions. It uses mixtures of selected protective colloids. At around 20 000 mPa*s (at 21° C.), the polymer dispersions described have comparatively high viscosities and are unsuitable for nozzle applications.

DE-A-199 62 566 describes a process for preparing dispersions on the basis of polyvinyl alcohol-stabilized vinyl ester-(meth)acrylic acid copolymers. A portion of the monomers is introduced as an initial charge, and the polymerization is carried out at temperatures of at least 60° C. In conjunction with hydraulically setting binders, the resulting dispersions can be used as sole binders for coating compositions and adhesive bonding agents, or as binders for textiles and paper. Redispersible powders can be produced from the dispersions by spraying. Their use as an adhesive for high-speed nozzles is not disclosed. Information on the particle size distribution of the dispersions is not apparent from the document. On the basis of the preparation examples, however, it can be assumed that the dispersions have the typical ratio of weight average to number average of the particle sizes, $d_w/d_n$, namely well below 2.5.

WO-A-99/42,504 discloses a process for preparing vinyl ester copolymer dispersions which are stabilized by polyvinyl alcohol and a selected emulsifier. The process is characterized by the metering of the monomer mixture in the temperature range between 67 and 80° C. at selected metering rates. The dispersions obtained can be used as coating compositions in the construction sector. This document too reveals no information concerning the particle size distribution of the dispersions. On the basis of the preparation examples, however, it can be assumed that these dispersions as well have the typical ratios of weight average to number average of the particle sizes, $d_w/d_n$.

Under defined laboratory conditions after two hours, commercially customary dispersions exhibit a buildup of contamination on the nozzle of more than 4 mm up to the point of complete contamination. In practice this means that, in certain circumstances, it would be necessary to halt the machine for about five minutes several times a day in order to clean the nozzles, with a corresponding interruption to the production process.

Furthermore, the adhesive must be able to be applied to substrates which are becoming increasingly difficult to bond to, because, for example, packaging for luxury goods, such as chocolates, perfumes or wine bottles, are enhanced using gloss varnishes. Varnishes of this kind lead to hydrophobic surfaces, which are difficult to bond using conventional adhesives for nozzle applications.

Starting out from this prior art, the object of the present invention was to provide a dispersion-based adhesive which is adapted for use in nozzle application processes and no longer has the disadvantages of the prior art. The dispersion-based adhesive of the invention possesses advantageous physicochemical properties, with the consequence of a significantly more advantageous buildup behavior; moreover, the dispersion-based adhesive of the invention possesses setting rates that are comparable with or indeed better than those of the products employed to date. Furthermore, the dispersion-based adhesive of the invention can be prepared in such a way that it is able to bond even difficult-to-bond hydrophobic surfaces, in conjunction with high heat stability.

Use of the dispersion-based adhesive of the invention considerably reduces the plant downtime, by at least 50% for example. Under defined laboratory conditions there should also be distinctly reduced contamination: for example, after two hours, a buildup of contamination of <3 mm.

The present invention provides an aqueous vinyl ester copolymer dispersion stabilized with at least one protective colloid combined with at least one emulsifier, said dispersion having a viscosity of less than 8000 mPa*s, measured at 23° C. using the Brookfield viscometer, spindle 5, 20 rpm, a weight average $d_w$ of the particle sizes of 0.5 to 10 µm, and a ratio of weight average to number average of the particle sizes, $d_w/d_n$, of at least 2.5, and the polymer possessing a glass transition temperature of between −30 and +15° C.

The vinyl ester copolymer dispersion of the invention possesses a very broad particle size distribution. This may be a broad distribution having only one maximum or else a broad distribution having two or more maxima (multimodal distribution) of the dispersion. It is important that the overall distribution is broad. These properties are expressed through the ratio $d_w/d_n$. The weight and number averages of the particle sizes are measured, for the purposes of this description, with the Mastersizer Microplus from Malvern, using the "polydisperse, Mie" evaluation.

The viscosity of the vinyl ester copolymer dispersion of the invention is preferably 100 to 8000 mPa*s, more particularly 200 to 4000 mPa*s, and very preferably 400 to 3000 mPa*s. For the purposes of this description the viscosity measurement is made using the Brookfield viscometer at 23° C. and using spindle 5 at 23 revolutions per minute (rpm). It will be appreciated that the dispersion can also be diluted further in order to be able to be employed at the nozzle. In that case there is a reduction in the solids content as well as the viscosity.

The weight average of the particle sizes, $d_w$, in the vinyl ester copolymer dispersion of the invention is preferably 0.5 to 6.0 µm, more particularly 0.8 to 5.0 µm, and the ratio $d_w/d_n$ is preferably 2.5 to 20.0, more particularly 3.0 to 15.0.

The vinyl ester copolymers of the dispersions of the invention have glass transition temperatures of typically from −30 to +15° C., preferably from −20 to +10° C., with particular preference −20 to +5° C. In the case of copolymers with a heterogeneous morphology, a core-shell morphology for example, it is sufficient for one of the phases to have glass transition temperatures of −30 to +15° C. For the purposes of the present description, glass transition temperatures are determined by DSC, with a heating rate of 10 K/minute.

For application, the vinyl ester copolymer dispersion of the invention is applied to a substrate through nozzles. For that purpose the nozzle is supplied in conventional manner with the aqueous vinyl ester copolymer dispersion, which typically has a solids content of at least 40% by weight, and the dispersion is applied from the nozzle, in the form of a continuous or predeterminately interrupted jet, to the substrate. This jet preferably has a thickness of less than 6 mm, with particular preference from 0.1 to 2 mm.

In accordance with the invention it is possible to use all nozzle application systems, more particularly systems having high switching frequencies of approximately up to 500 dots/second.

For example, the dispersion-based adhesive can be applied by means of HHS nozzle application systems from HHS, Krefeld. The valves involved may be D-valves or Vario-valves. These systems typically operate with the following technical data:

D-valves: glue pressure up to 35 bar; glue viscosity up to 2500 mPa*s; switching frequency up to 500/sec; and nozzle diameter 0.4 mm.

Vario-valves: glue pressure up to 6 bar; glue viscosity up to 500 mPa*s; switching frequency up to 1000/sec; and nozzle diameter 0.4 mm.

Further suitable nozzle application systems are the ECNS series systems from Robatech Glueing Technology. These systems typically have the following technical data: glue pressure 1-6 bar; glue viscosity max. 500 mPa*s; switching frequency max. 600/sec; and nozzle diameters 0.1-0.6 mm.

Further suitable nozzle application systems are the systems from ITW Dynatec Klebtechnik, Mettmann; from Reuther, Aichach; and from Nordson Deutschland GmbH, Erkrath.

By means of the nozzle application systems the vinyl ester copolymer dispersion is applied to the substrate in the form of a continuous or predeterminately interrupted jet. Application of the vinyl ester copolymer dispersion of the invention is not spray application; instead, jets of adhesive, or sections of such jets, are applied to the substrate.

Substrates suitable are any desired materials that are to be joined to one another. These materials may have smooth, rough or porous surfaces and may take a variety of forms, flat materials being an example. In respect of the material as well there are no constraints imposed on the substrates. Examples of materials of which the substrates to be bonded may be composed are metals, plastics, paint surfaces, paper, textiles, nonwovens or natural substances, such as wood.

The substrates to be bonded may possess absorbent surfaces or hydrophobic surfaces. Examples of absorbent surfaces are papers, including paperboard and cardboard, and other fiber webs. Examples of hydrophobic surfaces are polymeric films (e.g., polyester film, polyolefin film such as polypropylene or polyethylene, for example, polystyrene film, acetate film) or papers with a UV varnish coating. Any desired combination may occur in practice.

The vinyl ester copolymer dispersions of the invention are especially suitable for adhesives for nozzle application and, furthermore, have a high setting rate and universal bonding properties. In addition, the bonding properties can be controlled and further optimized through the incorporation into the polymer of "soft" comonomers, such as ethylene and/or acrylates.

Surprisingly it has been found that, through the use of the aqueous vinyl ester copolymer dispersion of the invention having a very broad overall particle size distribution, which may also be multimodal, in conjunction with a selected stabilizing system comprising protective colloids, more particularly polyvinyl alcohol, in combination with nonionic and/or ionic emulsifiers, it is possible to formulate dispersion-based adhesives having excellent nozzle running properties. Moreover, the preparation is very simple.

Preferred dispersions of the invention are further characterized by a yield point of 0.2 to 1.0, preferably 0.2 to 0.8 Pa, and more particularly of 0.3 to 0.6 Pa.

The yield point is the point of transition from elastic deformation to flow, and was determined using the Bohlin (now Malvern) CS Rheometer and the C-25 GE measuring system at 25° C. The initial shearing stress was 0.025 Pa, the final shearing stress 2 Pa. 100 linearly distributed measurement points were recorded in a measurement time of 60 seconds, and the viscosity was determined at the preset shearing stress. In the region of transition from elastic deformation to flow, the instantaneous viscosity exhibits a maximum, which is an indicator of the beginning of flow. The shearing stress at this maximum corresponds to the yield point.

The polymer dispersions used in accordance with the invention are prepared by free-radical emulsion polymerization of at least one vinyl ester of a carboxylic acid in combination if desired with further ethylenically unsaturated monomers copolymerizable therewith.

Suitable vinyl ester monomers typically include vinyl esters of aliphatic, saturated carboxylic acids having a chain length of $C_1$-$C_{18}$, preferably a chain length of $C_1$-$C_4$, and/or combinations (e.g., with vinyl esters of the VeoVa type). Examples of vinyl esters of saturated carboxylic acids having a chain length of $C_1$-$C_4$ and $C_5$-$C_{18}$, respectively, are given later on below.

Suitable further ethylenically unsaturated monomers that are copolymerizable with vinyl ester monomers include the free-radically polymerizable monomers that are known per se.

These are, for example, aromatic or aliphatic, $\alpha,\beta$-unsaturated, unsubstituted or halogen-substituted hydrocarbons, such as ethene, propene, 1-butene, 2-butene, vinyl chloride, and vinylidene chloride, preference being given to ethene.

Further comonomers which may be used in the copolymer are comonomers which allow the adhesion properties to be tailored. They include, primarily, esters of ethylenically unsaturated monocarboxylic or dicarboxylic acids with monohydric alcohols, more particularly esters of acrylic or methacrylic acid with aliphatic $C_1$-$C_8$ monoalcohols. Examples of particularly preferred monomers of this type are butyl acrylate or 2-ethylhexyl acrylate.

The stated monomers generally form the principal monomers, which in terms of the total amount of the monomers to be polymerized by the process of free-radical aqueous polymerization, normally make up a fraction of more than 80% by weight.

As a general rule these monomers are only of moderate to low solubility in water under standard conditions (25° C., 1 atm).

It will be appreciated that further comonomers which modify the properties in a specific way may be added. Such monomers are normally copolymerized only as modifying monomers, in amounts, based on the total amount of the monomers to be polymerized, of less than or equal to 20% by weight, generally 0.5% to 20%, preferably 1% to 10% by weight.

The monomers in question may be monomers which typically increase the internal strength of films of the aqueous vinyl ester copolymer dispersions. These monomers normally contain at least one epoxy, hydroxyl, N-methylol or carbonyl group, or at least two nonconjugated ethylenically unsaturated double bonds.

Examples thereof are N-alkylol amides of $\alpha,\beta$-monoethylenically unsaturated carboxylic acids containing three to ten carbon atoms, among which N-methylolacrylamide and N-methylolmethacrylamide are especially preferred, and also their esters with alkanols containing one to four carbon atoms. Also suitable in addition are monomers containing two vinyl radicals, monomers containing two vinylidene radicals, and monomers containing two alkenyl radicals.

Further examples of such monomers are diesters of dihydric alcohols with $\alpha,\beta$-monoethylenically unsaturated monocarboxylic acids, among which acrylic and methacrylic acid are preferred.

The vinyl ester copolymer dispersion of the invention constitutes a very broadly distributed or multimodal polymer dispersion, prepared by using protective colloids in combination with emulsifiers during the emulsion polymerization.

One aqueous vinyl ester copolymer dispersion with a very broad particle size distribution that is particularly preferred in accordance with the invention derives from at least one vinyl ester copolymer obtained by emulsion polymerization of at least one vinyl ester of an aliphatic carboxylic acid in the presence of at least one polyvinyl alcohol, preferably a mixture of polyvinyl alcohols, and nonionic emulsifiers.

Particularly preferred vinyl ester copolymers derive from
A1) vinyl esters of aliphatic, saturated carboxylic acids having a chain length of $C_1$-$C_4$,
A2) alpha-olefins having 2 to 8 carbon atoms, and/or
A3) vinyl esters of aliphatic, saturated carboxylic acids having a chain length of $C_5$-$C_{18}$, more particularly vinyl esters of $\alpha$-branched carboxylic acids having 5 to 11 carbon atoms in the acid radical (®Versatic acids),
A4) if desired, esters of ethylenically unsaturated monocarboxylic or dicarboxylic acids, more particularly of acrylic acid and/or of methacrylic acid and/or of maleic acid, with monohydric saturated alcohols, more particularly butyl acrylate (BuA) and/or 2-ethylhexyl acrylate (2-EHA) and/or dibutyl maleate and/or dioctyl maleate, and also A5) if desired, further comonomers which do not fall within one of groups A1 to A4), the sum of the monomers of types A1, A2 and/or A3 and/or, if desired, A4 and/or, if desired, A5 making 100% by weight.

Particularly preferred vinyl ester copolymers derive from monomers of types A1, A2 and/or, if desired, A4) or A1, A3 and/or, if desired, A4) or, preferably, from monomers of types A1, A2, A3 and/or, if desired, A4).

The vinyl esters A1 of aliphatic saturated carboxylic acids of chain length $C_1$-$C_4$ are vinyl esters of linear or branched aliphatic carboxylic acids, examples being vinyl formate, vinyl acetate, vinyl propionate, vinyl butyrate or vinyl isobutyrate. Vinyl acetate is preferred. In the polyvinyl esters the vinyl esters A1 may also be present in a combination of two or more thereof alongside one another.

The fraction of the monomers A1, where appropriate in combination with further comonomers from this group, is 40% to 95% by weight, preferably 50% to 80% by weight, based on the total amount of the monomers employed.

The alpha-olefins having 2 to 8 carbon atoms, A2, are branched or linear alpha-olefins, examples being prop-1-ene, but-1-ene, pent-1-ene, hex-1-ene, hept-1-ene, oct-1-ene, and in particular, ethylene.

The fraction of the monomers A2, where appropriate in combination with further comonomers from this group, is 0% to 45% by weight, preferably 5% to 45% by weight, more preferably 8% to 30% by weight, very preferably 12% to 28% by weight, based on the total amount of the monomers employed.

The vinyl esters A3 of aliphatic saturated carboxylic acids of chain length $C_5$-$C_{18}$ are vinyl esters of linear or, preferably, of branched aliphatic carboxylic acids, examples being vinyl esters of α-branched carboxylic acids having 5 to 11 carbon atoms in the acid radical (®Versatic acids), the vinyl esters of pivalic, 2-ethylhexanoic, lauric, palmitic, myristic, and stearic acid. Vinyl esters of Versatic acids, more particularly VeoVa® 9, VeoVa® 10, and VeoVa® 11, are preferred. In the polyvinyl ester the vinyl esters A3 may also be present in a combination of two or more thereof alongside one another.

The fraction of the monomers A3, where appropriate in combination with further comonomers from this group, is 0% to 60% by weight, preferably 0% to 40% by weight, more preferably 0% to 30% by weight, very preferably 0% to 25% by weight, based on the total amount of the monomers employed.

Suitable comonomers of group A4 which can be used in the copolymer are comonomers which can be used to tailor the adhesion properties. They include, primarily, esters of ethylenically unsaturated monocarboxylic or dicarboxylic acids with monohydric saturated alcohols, more particularly esters of acrylic or methacrylic acid or of maleic acid with aliphatic $C_1$-$C_8$-monoalcohols, more particularly (meth)acrylic esters or maleic diesters with monohydric aliphatic saturated alcohols of chain length $C_4$-$C_8$. Examples of particularly preferred monomers of this type are butyl acrylate, 2-ethylhexyl acrylate, dibutyl maleate or dioctyl maleate.

The fraction of the monomers A4, where appropriate in combination with further comonomers from this group, is 0% to 45% by weight, preferably 0% to 40% by weight, more preferably 0% to 30% by weight, very preferably 0% to 20% by weight, based on the total amount of the monomers employed.

Suitable comonomers of group A5 preferably possess at least one stabilizing nonionic or ionic group, preferably an acid group or an OH group in the molecule, which stabilize the emulsion polymer additionally via polymer-bonded functional groups and/or charges.

Particularly suitable comonomers A5 with stabilizing nonionic groups are esters of ethylenically unsaturated aliphatic monocarboxylic and/or dicarboxylic acids with polyalkylene glycols, preferably with polyethylene glycols and/or polypropylene glycols, or esters of ethylenically unsaturated carboxylic acids with amino alcohols, such as (meth)acrylic esters of amino alcohols, such as of diethylaminoethanol, for example, and/or (meth)acrylic esters with dimethylaminoethanol, and also (meth)acrylic esters with dihydric aliphatic alcohols of chain length $C_2$-$C_{18}$ in which only one alcohol group has been esterified. Also suitable are amides of ethylenically unsaturated carboxylic acids, such as amides of acrylic and methacrylic acid, and N-methylol amides of acrylic and methacrylic acid, and their ethers. A further group of these monomers are N-vinyl amides, including the N-vinyl lactams, such as vinyl pyrrolidone or N-vinyl-N-methylacetamide, for example.

Suitable comonomers A5 having stabilizing ionic groups are ethylenically unsaturated carboxylic acids or sulfonic acids which have one or two carboxyl groups or one sulfonic acid group. In place of the free acids it is also possible to use their salts, preferably alkali metal salts or ammonium salts.

Examples thereof are acrylic acid, methacrylic acid, crotonic acid, maleic acid, fumaric acid, itaconic acid, vinylsulfonic acid, styrenesulfonic acid, monoesters of maleic and/or fumaric acid, and of itaconic acid, with monohydric aliphatic saturated alcohols of chain length $C_1$-$C_{18}$, and also their alkali metal salts and ammonium salts, or (meth)acrylic esters of sulfoalkanols, an example being sodium 2-sulfoethyl methacrylate.

Further comonomers A5 which can be used to tailor the adhesion properties are ethylenically unsaturated silanes. These are, typically, monomers of the general formula RSi $(CH_3)_{0-2}(OR^1)_{3-1}$, in which R has the definition $CH_2=CR^2-(CH_2)_{0-1}$ or $CH_2=CR^2CO_2-(CH_2)_{1-3}$, $R^1$ is a branched or unbranched, unsubstituted or substituted alkyl radical having 1 to 12 carbon atoms, which if appropriate may be interrupted by an ether group, and $R^2$ is H or $CH_3$.

As further comonomers A5 which can be used in the copolymer it is possible to employ any desired comonomers which do not belong to groups A1, A2, A3 or A4. Examples of such are esters of aliphatic carboxylic acids of chain length $C_3$-$C_{12}$ with unsaturated alcohols of chain length $C_3$-$C_{18}$, vinyl chloride, vinylidene chloride, acrylonitrile and methacrylonitrile, butadiene, isoprene, $C_9$-$C_{16}$ alpha-olefins, 2-chlorobutadiene, 2,3-dichlorobutadiene, tetrafluoroethylene, styrene, vinyl ethers of monohydric aliphatic saturated alcohols of chain length $C_1$-$C_{18}$ divinyl and diallyl esters of saturated and unsaturated aliphatic dicarboxylic acids of chain length $C_3$-$C_{18}$, vinyl and allyl esters of acrylic acid and crotonic acid, triallyl cyanurate, and ethylenically unsaturated epoxide compounds, such as glycidyl methacrylate or glycidyl acrylate.

Preferred further comonomers A5 are $C_{14}$-$C_{16}$ alpha-olefins or butadiene or ethylenically unsaturated epoxide compounds.

The amount of the further comonomers A5 where present, where appropriate in combination with further comonomers from this monomer group, is typically up to 10% by weight, preferably up to 8% by weight, based on the overall copolymer composition A).

In the polyvinyl ester the comonomers A5 may also be present in a combination of two or more thereof alongside one another.

Preference is given to dispersions comprising polyvinyl acetate-ethylene copolymers, which in particular contain between 12 and up to 40 parts by weight of ethylene.

Another preferred variant of the dispersions of the invention comprises polyvinyl acetate-ethylene copolymers which additionally contain, in copolymerized form, 0.5 to 40 parts by weight of esters of acrylic acid and/or of esters of methacrylic acid and/or of diesters of maleic acid with monohydric saturated alcohols, more particularly butyl acrylate (BuA) and/or 2-ethylhexyl acrylate (2-EHA) and/or dibutyl maleate and/or dioctyl maleate.

The solids fraction of the aqueous vinyl ester copolymer dispersions of the invention with broad particle size distribution is typically 40% to 70% by weight, preferably 45% to 60% by weight, based on the overall solids content, more preferably between 50% and 55%.

The vinyl ester copolymer dispersions of the invention comprise a stabilizer mixture made up of at least one protective colloid, preferably of polyvinyl alcohols and/or modifications thereof in combination with at least one emulsifier, preferably a nonionic emulsifier.

The protective colloids are water-soluble or water-dispersible polymers which are present during the emulsion polymerization and stabilize the dispersion as it forms. Emulsifiers are low molecular weight compounds which stabilize the emulsion and also the product formed.

Examples of protective colloids are water-soluble or water-dispersible polymeric modified natural substances, such as cellulose ethers, examples being methyl-, ethyl-, hydroxyethyl- or carboxymethylcellulose; water-soluble or water-dispersible polymeric synthetic substances, such as polyvinyl alcohols or their copolymers (with or without residual acetyl content), and polyvinyl alcohol which is partially esterified or acetalized or etherified with saturated radicals.

The protective colloids can be used individually or, preferably, in combination. In the case of combinations they each differ in their molecular weights or they differ in their molecular weights and in their chemical composition, such as the degree of hydrolysis, for example.

In place of the molecular weight it is preferred to specify the viscosity of a 4% strength aqueous solution at 20° C. (measured using the Höppler viscometer).

Polyvinyl alcohol is generally prepared by hydrolysis of polyvinyl acetate.

In accordance with the invention at least one high molecular weight polyvinyl alcohol and/or at least one high molecular weight protective colloid other than polyvinyl alcohol, such as a cellulose ether, is taken initially. High molecular weight polyvinyl alcohol for the purposes of this description means a polyvinyl alcohol whose 4% strength aqueous solution at 20° C. (measured using the Höppler viscometer) has a viscosity of at least 18 mPa*s. A high molecular weight protective colloid other than polyvinyl alcohol is for the purposes of this description a protective colloid whose 2% strength aqueous solution at 20° C. (measured using the Höppler viscometer) has a viscosity of at least 1000 mPa*s.

Particularly suitable polyvinyl alcohol preferably possesses a degree of hydrolysis of 70 to 100 mol %, more preferably 80 to 99 mol %, with particular preference 87 to 99 mol %, and/or its aqueous solution possesses a viscosity at 20° C. of 18 to 60 mPa*s, 18-50 mPa*s, more particularly 18-40 mPa*s. In addition to these high molecular weight polyvinyl alcohols it is possible to use mixtures containing polyvinyl alcohols of lower molecular weight. Examples of polyvinyl alcohols with lower molecular weights are polyvinyl alcohols having a degree of hydrolysis of 70 to 100 mol %, preferably 80 to 99 mol %, more preferably 87 to 99 mol %, whose aqueous solution has a viscosity at 20° C. of 2 to 18 mPa*s, preferably 3-18 mPa*s, more particularly 4-18 mPa*s.

These and subsequent viscosity figures relate in each case to measurements with the Höppler viscometer.

Further suitable and particularly preferred polyvinyl alcohols may have been hydrophobically or hydrophilically modified in any way.

Examples of hydrophobically modified polyvinyl alcohols which do not contain water-soluble monomer units in their main chain are ethylene-containing polyvinyl alcohols of the type Exceval® from KSE. It is also possible, however, for other comonomers to be present in the polyvinyl alcohol, such as Versatic acid vinyl esters, AMPS, vinylsulfonate or carboxylic acid-containing alkylene compounds such as acrylic acid, methacrylic acid or itaconic acid, for example. The distribution of the comonomers within the polyvinyl alcohol may be blockwise and/or random, and allows the stabilization to be controlled, among other things.

Another preferred possibility is that of modification by arbitrary side-chain reactions on the polyvinyl alcohol, with preference being given to modification on the alcohol groups. By way of example, the alcohol groups of the polyvinyl alcohol may be partially acetalized, it being possible to furnish the polyvinyl alcohols with any desired radicals, which may be either hydrophobic or hydrophilic; more particularly, with polyvinyl alcohols modified with $C_1$-$C_{12}$ alkyl radicals, very preferably with butyl radicals, as described in DE-A-196 50 831.

It is, however, also possible to use polyvinyl alcohols having other modifications.

Mixtures of different polyvinyl alcohols can be used, or else just one type, preference being given to mixtures of polyvinyl alcohols having different molecular weights.

Particularly suitable polyvinyl alcohol possesses a degree of hydrolysis of 70 to 100 mol %, preferably 80 to 99 mol %, more preferably 87 to 99 mol %, and/or its 4% strength aqueous solution possesses a viscosity at 20° C. of 18.

In the case of protective colloids other than polyvinyl alcohol, protective colloids having the high molecular weights described above are used in the process of the invention.

Mixtures of different protective colloids can be used, or else only one type.

The total amount of the protective colloids used, more particularly of the polyvinyl alcohols and/or their modified derivatives, is typically 2% to 12% by weight, preferably 3% to 8% by weight, based on the total weight of all the monomers used to prepare the vinyl ester copolymer dispersion.

Besides the protective colloids, it is mandatory for the vinyl ester copolymer dispersion of the invention to additionally include emulsifiers. These may be nonionic emulsifiers E1 and/or anionic emulsifiers E2, preference being given to the nonionic emulsifiers.

Examples of nonionic emulsifiers E1 are acyl, alkyl, oleyl, and alkylaryl oxethylates. These products are commercially available, for example, under the name Genapol®, Lutensol® or Emulan®. They include, for example, ethoxylated mono-, di-, and tri-alkylphenols (EO degree: 3 to 50, alkyl substituent radical: $C_4$ to $C_{12}$) and also ethoxylated fatty alcohols (EO degree: 3 to 80; alkyl radical: $C_8$ to $C_{36}$), especially $C_{12}$-$C_{14}$ fatty alcohol (3-40)ethoxylates, $C_{13}C_{15}$ oxo-process alcohol (3-40)ethoxylates, $C_{16}C_{18}$ fatty alcohol (11-80)ethoxylates, $C_{10}$ oxo-process alcohol (3-40)ethoxylates, $C_{13}$ oxo-process alcohol (3-40)ethoxylates, polyoxyethylenesorbitan monooleate with 20 ethylene oxide groups, copolymers of ethylene oxide and propylene oxide having a minimum ethylene oxide content of 10% by weight, the polyethylene oxide (4-40) ethers of oleyl alcohol, and the polyethene oxide(4-40) ethers of nonylphenol. Particularly suitable are the polyethylene oxide(4-40) ethers of fatty alcohols, more particularly of oleyl alcohol, stearyl alcohol or $C_{11}$ alkyl alcohols.

The amount of nonionic emulsifiers E1 used is typically 0.05% to 5.0% by weight, preferably 0.05% to 4.0% by weight, more preferably 0.05% to 1.5% by weight, based on the polymer. Mixtures of nonionic emulsifiers can also be employed.

Examples of anionic emulsifiers E2 are sodium, potassium, and ammonium salts of linear aliphatic carboxylic acids of chain length $C_{12}$-$C_{20}$, sodium hydroxyoctadecanesulfonate, sodium, potassium and ammonium salts of hydroxy fatty acids of chain length $C_{12}$-$C_{20}$ and their sulfonation and/or sulfation and/or acetylation products, alkyl sulfates, including those in the form of triethanolamine salts, alkyl($C_{10}$-$C_{20}$)sulfonates, alkyl($C_{10}$-$C_{20}$)arylsulfonates, dimethyl-dialkyl ($C_8$-$C_{18}$)ammonium chloride, and their sulfonation products, lignosulfonic acid and its calcium, magnesium, sodium, and ammonium salts, resin acids, hydrogenated and dehydrogenated resin acids, and their alkali metal salts, dodecylated sodium diphenyl ether disulfonate, sodium lauryl sulfate, ethoxylated sodium lauryl ether sulfate (EO degree 3) or a salt of a bisester, preferably of a bis-$C_4$-$C_{18}$ alkyl ester, of a sulfonated dicarboxylic acid having 4 to 8 carbon atoms, or a mixture of these salts, preferably sulfonated salts of esters of succinic acid, more preferably salts, such as alkali metal salts, of bis-$C_4$-$C_{18}$ alkyl esters of sulfonated succinic acid.

The amount of anionic emulsifiers E2 used is typically 0.05% to 5.0% by weight, preferably 0.05% to 2.0% by weight, more preferably 0.05% to 1.5% by weight, based on the polymer. Mixtures of anionic emulsifiers can also be employed.

Mixtures of nonionic and anionic emulsifiers can also be employed. The weight fraction of emulsifiers E1 to E2 may fluctuate within wide ranges, between 50:1 and 1:1 for example.

In addition to the protective colloids and emulsifiers that are used during the emulsion polymerization it is additionally possible to have the dispersions of the invention containing subsequently added water-soluble or water-dispersible polymers and/or subsequently added emulsifiers too.

The total fraction of emulsifiers, based on the polymer, is typically 0.05% to 5% by weight, preferably 0.05% to 4.0% by weight, more preferably 0.05% to 1.5% by weight.

It is preferred to use nonionic emulsifiers only.

Vinyl ester copolymer dispersions used with particular preference contain polyvinyl alcohol in an amount of 3% to 10% by weight, based on the monomers employed, and contain emulsifier in an amount of 0.05-1.5 parts by weight.

Where appropriate, the aqueous vinyl ester copolymer dispersions of the invention further comprise additional additions which are typical per se in the formulation of dispersion-based adhesives.

These include, for example, film-forming assistants, such as white spirit, Texanol®, TxiB®, butyl glycol, butyldiglycol, butyldipropylene glycol, and butyltripropylene glycol; plasticizers, such as dimethyl phthalate, diisobutyl phthalate, diisobutyl adipate, Coasol B®, Plastilit 3060®, and Triazetin®; wetting agents, such as AMP 90®, TegoWet.280®, Fluowet PE®; thickeners, such as polyacrylates or polyurethanes, such as Borchigel L75® and Tafigel PUR 60®; defoamers, such as mineral oil defoamers or silicone defoamers; UV protectants, such as Tinuvin 1130®, subsequently added stabilizing polymers, such as polyvinyl alcohol or cellulose ethers, and other additives and auxiliaries of the kind typical for the formulation of adhesives.

The fraction of these additions in the dispersion-based adhesive of the invention can be up to 25% by weight, preferably 2% to 15% by weight, and in particular 5% to 10% by weight, based on the dispersion.

The aqueous vinyl ester copolymer dispersions of the invention are advantageously prepared by emulsion polymerization of at least one vinyl ester of an aliphatic carboxylic acid, by:

a) initially introducing 2% to 10% by weight, based on the total weight of all the monomers used to prepare the vinyl ester copolymer dispersion, of at least one polyvinyl alcohol having a viscosity of the 4% strength aqueous solution, measured by the method of Höppler at 20° C., of at least 18 mPa*s and/or of at least one other protective colloid which is not a polyvinyl alcohol, having a viscosity of the 2% strength aqueous solution, measured by the method of Höppler at 20° C., of at least 1000 mPa*s, b) initially introducing 0.05% to 5% by weight, based on the total weight of all the monomers used to prepare the vinyl ester copolymer dispersion, of at least one nonionic emulsifier and/or ionic emulsifier, preferably an alkyl and/or aryl ethoxylate, c) initially introducing 0% to 60% by weight, based on the total weight of all the monomers used to prepare the vinyl ester copolymer dispersion, of the monomer or monomers, d) adding at least one vinyl ester of a carboxylic acid, preferably in combination with ethylene, and at least one initiator of free-radical emulsion polymerization to the mixture comprising components a), b), and, if appropriate, c), and by e) selecting the type and amount of the monomers so as to form a vinyl ester copolymer dispersion having a glass transition temperature of between −30 and +15° C.

As a consequence of the implementation of the polymerization as a metering process, the initial charge containing, where appropriate, up to 60% of monomers and also a combination of at least one high molecular weight protective colloid with at least one emulsifier, vinyl ester copolymer dispersions are formed which have the broad particle size distribution described above, preferably with a weight average particle size distribution $d_w$ of the dispersion of 0.5 to 6.0 μm, more particularly 0.7 to 5.0 μm, and a ratio $d_w/d_n$ of preferably 2.5 to 20.0, more particularly 3.0 to 15.0.

In the process of the invention the monomers are selected so as to form copolymers whose glass transition temperature lies between −30 to +15° C., preferably between −20 to +10° C., and very preferably between −20 and +5° C. The skilled worker is aware of the selection criteria for achieving this.

The preparation of the dispersions of the invention may take place via a process of emulsion polymerization, in which the monomer is metered in continuously or discontinuously or is present at up to 60% by weight in the initial charge. Preference is given to continuous metering.

By virtue of steps a) and b), the protective colloids and emulsifiers are already in the initial charge, and may additionally be added during the polymerization. Additional quantities of them, moreover, may also still be added after the polymerization. Preferably the entirety of the stabilizer is included in the initial charge, though it is also possible to add a part of the stabilizer at the beginning and to add the remainder after the polymerization has been initiated, in one or more steps, or continuously. The addition may take place separately or together with other components, such as monomers and/or initiators, or else in the form of a monomer emulsion.

The protective colloids used to prepare the polymer dispersion that is employed preferably in accordance with the invention, preferably the mixtures of polyvinyl alcohols and/or their modified derivatives, are preferably dissolved at the beginning of the polymerization (typically in water) and introduced at least 85° C., preferably at least 90° C., for two to three hours and before the polymerization.

It will be appreciated that in addition to the vinyl esters it is also possible to employ comonomers. Examples thereof have been given earlier on above.

The preparation of aqueous polymer dispersions has already been described in numerous instances and is therefore known to the skilled worker [cf., e.g., Encyclopedia of Polymer Science and Engineering, vol. 8, p. 659 ff (1987)].

It is preferably accomplished by emulsion polymerization of at least one vinyl ester monomer in the presence of a preferably water-soluble polymerization initiator and also in the presence of stabilizers and, if desired, additional emulsifiers and, if desired, typical further additives. Alternatively it can be carried out in other heterophase systems, with the measures a) to f) described above preferably being taken.

In general the addition of the monomers takes place by continuous feed; alternatively it is possible to include up to 60% by weight of the monomers in the initial charge.

The polymerization may also be carried out in a manner known per se in two or more stages with different monomer combinations, giving polymer dispersions having particles with heterogeneous morphology.

Suitable initiators for the free-radical polymerization, for initiating and continuing the polymerization during the preparation of the dispersions, include all known initiators which are capable of initiating a free-radical, aqueous polymerization in heterophase systems.

These initiators may be peroxides, such as alkali metal and/or ammonium peroxodisulfates, or azo compounds, more particularly water-soluble azo compounds.

As polymerization initiators it is also possible to use what are called redox initiators. Examples thereof are tert-butyl hydroperoxide and/or hydrogen peroxide in combination with reducing agents, such as with sulfur compounds, an example being the sodium salt of hydroxymethanesulfinic acid, Brüggolit FF6 and FF7, Rongalit C, sodium sulfite, sodium disulfite, sodium thiosulfate, and acetone-bisulfite adduct, or with ascorbic acid or with reducing sugars.

The amount of the initiators or initiator combinations used in the process varies within what is usual for aqueous polymerizations in heterophase systems. In general the amount of initiator used will not exceed 5% by weight, based on the total amount of the monomers to be polymerized.

The amount of initiators used, based on the total amount of the monomers to be polymerized, is preferably 0.05% to 2.0% by weight.

In this context it is possible for the total amount of initiator to be included in the initial charge at the beginning of the polymerization; preferably, alternatively, a portion of the initiator is included in the initial charge at the beginning, and the remainder is added after the polymerization has been initiated, in one or more steps or continuously. The addition may be made separately or together with other components, such as emulsifiers.

The molecular weight of the polymers of the aqueous polymer dispersions can be adjusted by adding small amounts of one or more molecular weight regulator substances. These regulators, as they are known, are generally used in an amount of up to 2% by weight, based on the monomers to be polymerized. As regulators it is possible to use all of the substances known to the skilled worker. Preference is given, for example, to organic thio compounds, silanes, allyl alcohols, and aldehydes.

The aqueous polymer dispersion may further comprise a range of additional substances, such as plasticizers, preservatives, agents for adjusting the pH and/or defoamers, for example.

The polymerization temperature is generally 20 to 150° C. and preferably 50 to 100° C.

The polymerization takes place under pressure if appropriate, preferably 10-150 bar, more preferably 30 to 95 bar.

Following the polymerization reaction proper it may be desirable and/or necessary largely to free the resultant aqueous polymer dispersion from odorous substances, such as residual monomers and other volatile organic constituents, for example. This can be done in a manner known per se, physically for example, by distillative removal (in particular via steam distillation) or by stripping with an inert gas. A further possibility is also to reduce the residual monomer content chemically, by means of free-radical post-polymerization, more particularly by exposure to redox initiator systems, as described, for example in DE-A-4,435,423. Preference is given to a post-polymerization with a redox initiator system made up of at least one organic peroxide and also one organic and/or inorganic sulfite and/or sulfinic acid derivatives.

Particular preference is given to a combination of physical and chemical methods, where after the residual monomer content has been lowered by chemical post-polymerization the further lowering of the residual monomer content is accomplished by means of physical methods, to preferably <2000 ppm, more preferably <1000 ppm, in particular <100 ppm.

The polymerization is typically carried out at a pH in the region of less than/equal to 9. To adjust the pH of the polymer dispersion it is possible in principle to use buffer systems, such as sodium acetate, for example, or phosphate buffer systems.

Preferably a pH range of 2 to 9 is favorable, a preferred pH being in the range between 3 and 8.

The solids content of the vinyl ester copolymer dispersions of the invention is at least 40% by weight, preferably between 45% and 60% by weight, and with particular preference between 50% and 55%. The weight figures here are based on the total mass of the dispersion.

The invention also relates to the use of the above-described polymer dispersion for nozzle application to substrates.

Application may take place two-dimensionally or, preferably, in dot or line format.

The dispersion-based adhesives of the invention are used preferably for the adhesive bonding of coated or uncoated paper in the production-line fabrication of folding boxes, envelopes, brochures, and cigarettes, more particularly for producing paper/paper bonds (coated and uncoated) or paper/polymeric film bonds.

A particular feature of this invention, in addition, is that the dispersions can be prepared in such a way that they can be used to bond even difficult-to-bond substrates, such as papers coated with UV varnish, without the heat stability dropping to a critical level (<60° C.).

These uses are likewise provided by the present invention.

The examples below illustrate the invention without limiting it.

MEASUREMENT METHODS

Measuring the Particle Size Distribution

Figure 1:
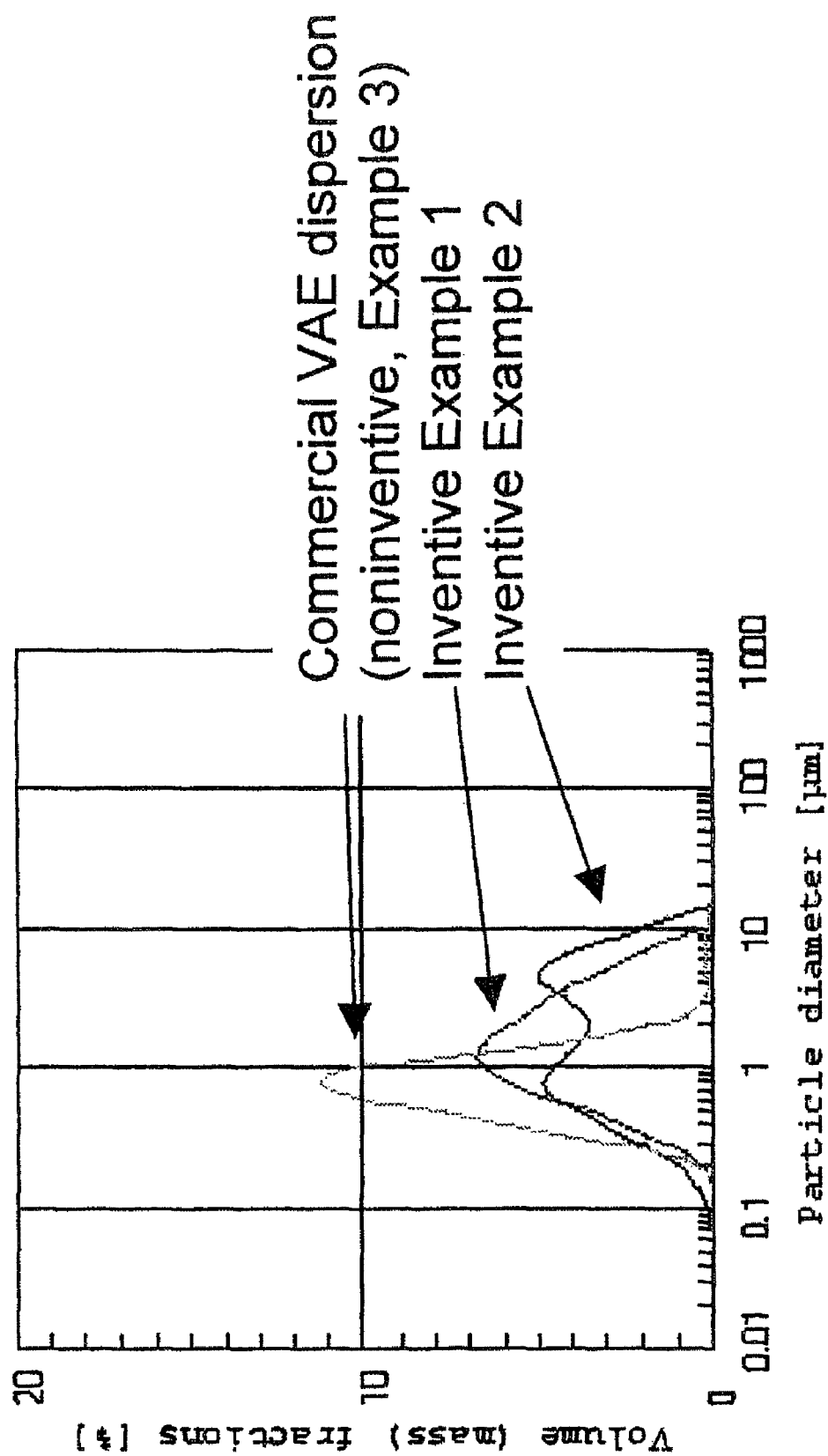
FIG. 1 depicts a graph of the particle size distribution of the dispersions of Examples 1 to 3.

The particle size distribution was measured using the Mastersizer Micro Plus laser diffraction instrument from Malvern. The scatter data were evaluated using the volume-averaged "polydisperse Mie" evaluation provided by Malvern.

Glass Transition Temperature

The glass transition temperature was measured using a Mettler DSC 820 at 20 K/min. Evaluation was carried out on the second heating curve.

EXAMPLE 1

A 60 l pressure apparatus with stirrer, jacket heating, and metering pumps was charged with an aqueous solution consisting of the following constituents:

| | |
|---|---|
| 13109 g | DI water (deionized water) |
| 5898 g | Celvol ® 508 (15% in DI water, polyvinyl alcohol from Celanese) |
| 2524 g | Celvol ® 523 (15% in DI water, polyvinyl alcohol from Celanese) |
| 17 g | sodium acetate |
| 112 g | Genapol ® T 250 (ethoxylate-based nonionic emulsifier from Clariant) |
| 17.6 g | sodium disulfite |
| 0.06 g | Mohr salt |

The polyvinyl alcohols were each dissolved beforehand in a 15% strength solution at 90° C. for 2 hours.

The aqueous solution was adjusted with about 5.6 g of acetic acid to a pH of 4.8-5.2. The apparatus was freed from atmospheric oxygen. 8% of the amount of vinyl acetate (total amount 20474 g) was metered into the reactor. The ethylene valve was opened. At the same time the temperature was raised to 60° C. and the ethylene pressure was adjusted such that at 60° C. the pressure exerted is 42 bar. The total amount of ethylene was 6133 g. The ethylene valve was only closed again when the total amount was in the reactor. The metered feeds of the redox initiators—

5 g Brüggolit FF7 (reducing agent from Brüggemann) in 1519 g of DI water 44.6 g sodium peroxodisulfate in 1519 g of water— and of the remaining amount of vinyl acetate were commenced after 10 minutes' stirring. The length of the metering of the vinyl acetate was 7.5 hours, and that of the initiators 8 hours. In the course of these metered additions the ethylene pressure was held constant at 42 bar and the temperature at 60° C. After the end of the vinyl acetate feed the batch was heated to 85° C. over the course of 60 minutes and was held at that temperature for 1 hour. For the purpose of reducing the amount of residual monomer, the batch was cooled to 60° C. and treated with known redox systems (e.g., hydrogen peroxide/tartaric acid/Mohr salt) and/or a physical treatment was conducted.

Characteristic Data of Example Dispersion 1

| | |
|---|---|
| dry matter: | 53% |
| pH (electrode measurement): | 5 |
| Brookfield viscosity (23° C., spindle 4, 20 rpm): | 5700 mPa * s |
| residual monomer content: | <0.2% |
| glass transition temperature of polymer (20 K/min): | 5° C. |
| particle size distribution (Mastersizer, polydisperse, Mie): | $d_w = 1.9$ μm |
| | $d_w/d_n = 4.5$ |

EXAMPLE 2

A 60 l pressure apparatus with stirrer, jacket heating, and metering pumps was charged with an aqueous solution consisting of the following constituents:

| | |
|---|---|
| 12143 g | DI water (deionized water) |
| 5862 g | Celvol ® 508 (15% in DI water, polyvinyl alcohol from Celanese) |
| 2508 g | Celvol ® 523 (15% in DI water, polyvinyl alcohol from Celanese) |
| 111 g | Genapol ® T 250 (ethoxylate-based nonionic emulsifier from Clariant) |
| 31.7 g | tartaric acid |
| 0.95 g | iron(III) chloride solution (40% in DI water) |
| 5.5 g | Rongalit ® C (sodium formaldehyde-sulfoxylate, BASF) |

The polyvinyl alcohols were each dissolved beforehand in a 15% strength solution at 90° C. for 2 hours.

The apparatus was freed from atmospheric oxygen. At 36° C. 50% of the amount of vinyl acetate (total amount: 18367 g) was metered into the reactor. The ethylene valve was opened and 57% of the ethylene (total amount: 8079 g) was forced into the reactor. The ethylene valve was closed. After 15 minutes for equilibrium adjustment, 90 g each of reducing agent solution (total amount: 85 g of Rongalit C in 1909 g of DI water) and oxidizing agent solution (total amount: 97 g of 35% hydrogen peroxide in 1909 g of water) were added over the course of 5 minutes. At the same time the internal temperature was taken to 80° C. After the start of the reaction (exothermic reaction) the metered feeds were commenced:

vinyl acetate, 8000 g in 90 minutes; reducing agent solution and oxidizing agent solution in 4 hours.

At the same time, via automatic regulation of the pumps for oxidizing agent and reducing agent, the internal temperature was controlled in such a way that it was 80° C. The jacket temperature was set at a fixed 45° C. Toward the end of the 4-hour metering time (approximately after 3 hours) there was a sharp increase in the metering rate and, if necessary, the jacket temperature was raised in a ramp to up to 75° C. in order to maintain the 80° C. internal temperature. After the end of the vinyl acetate feed the remainder (1183 g) was metered in at a rate of 3.55 kg/h. After the end of the metered feeds post-polymerization was carried out at 65° C. for 1 hour. Subsequently, at 65° C., for the purpose of residual monomer reduction, a redox process was added on (e.g., hydrogen peroxide/tert-butylhydroperoxide/Rongalit C/iron(III) chloride) and/or a physical treatment was carried out.

Characteristic Data of Example Dispersion 2

| | |
|---|---|
| dry matter: | 51% |
| pH (electrode measurement): | 3 |
| Brookfield viscosity (23° C., spindle 4, 20 rpm): | 5300 mPa * s |
| residual monomer content: | <0.2% |
| glass transition temperature of polymer (20 K/min): | −5° C. |
| particle size distribution (Mastersizer, polydisperse, Mie): | $d_w$ = 2.5 µm |
| | $d_w/d_n$ = 14 |

EXAMPLE 3

Comparative

Commercial VAE (vinyl acetate-ethylene) dispersion stabilized only with polyvinyl alcohol (PVOH).
Characteristic Data of Comparative Dispersion 3

| | |
|---|---|
| dry matter: | 55% |
| pH (electrode measurement): | 4 |
| Brookfield viscosity (23° C., spindle 4, 20 rpm): | 4000 mPa * s |
| residual monomer content: | <0.2% |
| glass transition temperature of polymer (20 K/min): | 7° C. |
| particle size distribution (Mastersizer, polydisperse, Mie): | $d_w$ = 0.86 µm |
| | $d_w/d_n$ = 2.26 |

FIG. 1 shows the particle size distribution of the dispersions of examples 1 to 3. The broad particle size distributions of the two inventive dispersions are evident in comparison to the relatively narrow distribution of the prior-art VAE dispersion.

EXAMPLE 4

Nozzle Application and Adhesive Properties

1. Buildup
Application to a high-speed conveyor belt was simulated in the laboratory by application to a stainless steel roller rotating at high speed. The roller had a diameter of approximately 26 cm and was rotated with a speed of 100 m/min. Located vertically above the roller was a device having 3 glue application nozzles. These nozzles were supplied with the adhesive by means of a hoseline system via a piston pump (pressure 5-40 bar; 10 bar were used in the tests). The distance between the nozzle and the roller was 4 mm. The glue application nozzles (e.g., hhs, D-valve) were driven via an electronic control unit. The simulation was carried out at the profile of the side-seam bonding of a folding box 12 cm long. 12 glue dots were applied in a row. The open time of the valve was 4 ms, and the closed time between 2 dots was 2 ms. The total time for a row with a total of 12 glue dots was therefore 70 ms.

A sequence consisted of 4 rows, with a pause of 55.3 ms between the individual rows (to simulate the distance between 2 substrates on the conveyor belt). Between 2 sequences there was a pause of 165.6 ms.

This profile was run over a time of 2 hours, and at 15-minute intervals the stalactitic buildup on the nozzle was measured by means of digital image analysis. For these measurements the dispersion was diluted to the point where it exhibited a viscosity of approximately 1000 mPa*s. The result is the buildup in mm over the time in minutes.

2. Tailing
The tailing was determined by digital image analysis of the drops applied to the stainless steel roller, using a high-speed camera. Application in the case of this experiment was in principle similar to that described under 1, except that the running speed of the roller was 250 m/min and the distance between the nozzle and the roller was 10 mm. The cycle sequence of the nozzle was 4 ms for one glue dot and 3.4 ms between 2 glue dots. The result reports the drop measured in the lengthwise direction from the "head" to the "tail".

3. Manual Setting Rate
3.1 Using a slotted coating bar (50 µm wet film), the adhesive was applied to the glazed side of a piece of cardboard cut to a length of 40 cm and a width of 10 cm, e.g., GD1 Juwel Top (250 g/m$^2$), which had been provided with a cm scale.

3.2 Directly after the application of the adhesive, a strip of paper cut to a length of 55 cm and a width of 5 cm, e.g., kraft paper (80 g/m$^2$), was placed on the film of adhesive and adhered by pressing down using a manual roller.

3.3 Immediately after the completion of the bond, the paper strip was peeled from the card by hand at a speed of about 1 cm/s until clearly visible fiber extraction occurred.

3.4 As a result of the scaling on the cardboard strip it was now possible to correlate the distance traveled to the beginning of fiber extraction with a time (1 cm corresponds to 1 s). This figure corresponded to the setting time of the adhesive, and was reported.

4. Bonding of Substrates (UV-Coated Papers)
The paper substrates coated with UV varnish were coated with a 100 µm wet application of the adhesive and with a width of 4 cm on the coated side. The substrates may be, for example, papers from Weilburger Graphics GmbH, UV 360040/49=high molecular weight, UV 360050/59=low molecular weight). Adhesive bonding was performed in different versions: 1. face to face bonding (coated side to coated side), 2. face to back bonding (coated side to uncoated side). The substrates were loaded with a 1 kg weight for approximately 2 minutes and then stored for at least 3 days in a controlled-climate chamber at 23° C. and 50% relative atmospheric humidity. The quality of the adhesive bond was evaluated by manual peeling apart of the bonded substrates (fiber rupture in %).

5. Heat Stability
The glazed side of a kraft paper sheet (Glock paper, 70 g/cm$^2$), which beforehand had been coated with a 75 µm wet application of the adhesive in a width of 1 cm, was bonded to the unglazed side of the craft paper. The bonded substrates were loaded with a 1 kg weight for approximately 2 minutes and then stored at room temperature for 24 hours. Subsequently strips 2.5 cm wide were cut from the paper composite. The strips were loaded with 200 g and suspended in a drying cabinet at 30° C. The temperature was raised by 5° C. every 30 minutes. The heat stability corresponded to the temperature at which the test strip is still held. The maximum value was 110° C.

TABLE 1

Results from example 4

| Dispersion from example | Behavior at the nozzle | | Adhesive properties | | heat stability | Particle size distribution | |
|---|---|---|---|---|---|---|---|
| | buildup (mm/h) | tailing (mm) | manual setting rate(s) | bonding of UV-coated papers (UV 360050/59) | | $d_w$ in µm | $d_w/d_n$ |
| 1 (inventive) | 1.5 | 14.0 | 18 | – (0% fiber rupture) | 70° C. | 1.9 | 4.87 |
| 2 (inventive) | 0.7 | 10.6 | 17 | + (100% fiber rupture) | >100° C. | 2.53 | 14.1 |
| 3 (reference) | 4 (nozzle clogged) | 14.6 | 18 | – (0% fiber rupture) | >100° C. | 0.86 | 2.26 |

The inventive examples 1 and 2 show only very slight buildup at the nozzle, whereas after just 1 hour the reference dispersion shows a buildup of >4 mm. The tailing is comparable with the state of the art. The adhesive properties in the inventive examples can be set such that they adhere very well even to apolar and difficult-to-bond substrates, and without the heat stability being affected (example 2). Even after addition of 5% of plasticizer (Benzoflex 2088) in the inventive example 2, which improves the bonding to high molecular weight UV varnish, there is still a heat stability of 100° C.

Figure 2A:
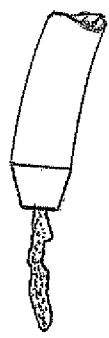
FIG. 2a shows the behavior of the inventive dispersions of Examples 1 and 2 respectively. After 2 hours a buildup of 1.5 mm is apparent, and the nozzle is still not clogged. In addition, the form of the buildup is not as disruptive as in the reference case, since the jet of adhesive is not diverted uncontrolledly.
Figure 2B:
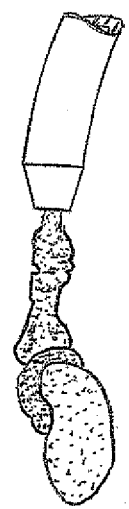
FIG. 2b shows the contamination at the nozzle in the case of the reference dispersion (Example 3).

The tailing of the tested dispersions is depicted in FIGS. 2a and 2b.

FIG. 2a shows the behavior of the inventive dispersions of examples 1 and 2 respectively. After 2 hours a buildup of 1.5 mm is apparent, and the nozzle is still not clogged. In addition, the form of the buildup is not as disruptive as in the reference case, since the jet of adhesive is not diverted uncontrolledly.

FIG. 2b shows the contamination at the nozzle in the case of the reference dispersion (example 3; clogs after <60 minutes).

What is claimed is:

1. An aqueous vinyl ester copolymer dispersion stabilized with at least two polyvinyl alcohols having different molecular weights combined with from 0.05% to 5% by weight, based on the total amount of monomers employed, of at least one emulsifier, said dispersion having a viscosity of less than 8000 mPa*s, a weight average $d_w$ of the particle sizes of 0.5 to 10 and a ratio of weight average to number average of the particle sizes, $d_w/d_n$, in the range of from 2.5 to 20.0, wherein said copolymer possesses a glass transition temperature of from −20 to +5° C., wherein said at least one emulsifier is selected from the group consisting of ethoxylated, non-ionic emulsifiers, ethoxylated, anionic emulsifiers, or combinations thereof and wherein an aqueous solution of at least one of said at least two polyvinyl alcohols possesses a viscosity at 20° C. of from 18 to 60 mPa*s and an aqueous solution of at least one of said at least two polyvinyl alcohols possesses a viscosity at 20° C. of from 2 to 18 mPa*s.

2. The aqueous vinyl ester copolymer dispersion of claim 1, wherein said viscosity is from 100 to 8000 mPa*s.

3. The aqueous vinyl ester copolymer dispersion of claim 1, wherein said weight average of the particle sizes, $d_w$, is 0.5 to 6.0 µm.

4. The aqueous vinyl ester copolymer dispersion of claim 1 derived from at least one vinyl ester copolymer obtained by emulsion polymerization of
   A1) vinyl esters of aliphatic, saturated carboxylic acids having a chain length of $C_1$-$C_4$;
   A2) alpha-olefins having 2 to 8 carbon atoms; and/or
   A3) vinyl esters of aliphatic, saturated carboxylic acids having a chain length of $C_5$-$C_{18}$;
   wherein the sum of A1), A2), and/or A3) is 100% by weight.

5. The aqueous vinyl ester copolymer dispersion of claim 4, wherein said at least one vinyl ester copolymer is obtained by emulsion polymerization of A1), A2) and/or A3) with
   A4) esters of ethylenically unsaturated monocarboxylic or dicarboxylic acids with monohydric saturated alcohols; and/or
   A5) further comonomers which are not A1), A2), A3), or A4);
   wherein the sum of A1), A2), and/or A3) and/or A4), and/or A5) making 100% by weight.

6. The aqueous vinyl ester copolymer dispersion of claim 4, comprising polyvinyl acetate-ethylene copolymers or polyvinyl acetate ethylene copolymers which further contain, in copolymerized form, 0.5 to 40 parts by weight of esters of acrylic acid and/or of esters of methacrylic acid and/or of diesters of maleic acid with monohydric saturated alcohols.

7. The aqueous vinyl ester copolymer dispersion of claim 6, comprising polyvinyl acetate-ethylene copolymers.

8. The aqueous vinyl ester copolymer dispersion of claim 1, wherein said at least one emulsifier is at least one nonionic emulsifier.

9. The aqueous vinyl ester copolymer dispersion of claim 1, wherein the amount of said at least one protective colloid is 3% to 10% by weight and the amount of said at least one emulsifier is 0.05% to 1.5% by weight, based in each case on the total amount of monomers employed.

10. The aqueous vinyl ester copolymer dispersion of claim 1, wherein said dispersion has a yield point of 0.2 to 1.0 Pa.

11. The aqueous vinyl ester copolymer dispersion of claim 10, wherein said yield point is 0.3 to 0.6 Pa.

12. A process for preparing the aqueous vinyl ester copolymer dispersion of claim 1 by emulsion polymerization of at least one vinyl ester of an aliphatic carboxylic acid comprising
   a) initially introducing 2% to 10% by weight, based on the total weight of all the monomers used to prepare said aqueous vinyl ester copolymer dispersion, of at least two polyvinyl alcohols having different molecular weights, wherein at least one of said at least two polyvinyl alcohols has a viscosity of the 4% strength aqueous solution, measured by the method of Höppler at 20° C., of at least 18 mPa*s and at least one of said at least two polyvinyl alcohols has a viscosity of the 4% strength aqueous solution, measured by the method of Höppler at 20° C., of from 2 to 18 mPa*s;

b) adding 0.05% to 5% by weight, based on the total weight of all the monomers used to prepare said aqueous vinyl ester copolymer dispersion, at least one nonionic emulsifier and/or ionic emulsifier to the said at least two polyvinyl alcohols to form a mixture;

c) adding 0% to 60% by weight, based on the total weight of all the monomers used to prepare said aqueous vinyl ester copolymer dispersion, of monomer or monomers to the mixture of b) to form a mixture;

d) adding at least one vinyl ester of a carboxylic acid and at least one initiator of free-radical emulsion polymerization to the mixture of c); and e) forming an aqueous vinyl ester copolymer dispersion having a glass transition temperature of between −30 and 15° C.

13. The process of claim 12, wherein one polyvinyl alcohol of said at least two polyvinyl alcohols has a degree of hydrolysis of from 70 to 100 mol % and its 4% strength aqueous solution has a viscosity at 20° C. of 18 to 60 mPa*s and wherein a second polyvinyl alcohol has a degree of hydrolysis of from 70 to 100 mol % and its 4% strength aqueous solution has a viscosity at 20° C. of 2 to 18 mPa*s.

14. An adhesive for nozzle application to a substrate, wherein said adhesive comprises the aqueous vinyl ester copolymer dispersion of claim 1.

15. The adhesive of claim 14, wherein the substrates are hydrophobic substrates.

16. The adhesive of claim 14, wherein said nozzle application is dotwise or linear.

17. The adhesive of claim 14, wherein said substrate is bonding paper used in the production-line fabrication of folding boxes, envelopes, brochures, or cigarettes.

18. The aqueous vinyl ester copolymer dispersion of claim 1, wherein said at least two polyvinyl alcohols each have a degree of hydrolysis of from 80 to 99 mol % and/or wherein an aqueous solution of at least one of said at least two polyvinyl alcohols possesses a viscosity at 20° C. of from 18 to 50 mPa*s and an aqueous solution of at least one of said at least two polyvinyl alcohols possesses a viscosity at 20° C. of from 3 to 18 mPa*s.

19. The aqueous vinyl ester copolymer dispersion of claim 1, wherein said at least two polyvinyl alcohols each have a degree of hydrolysis of from 87 to 99 mol % and/or wherein an aqueous solution of at least one of said at least two polyvinyl alcohols possesses a viscosity at 20° C. of from 18 to 40 mPa*s and an aqueous solution of at least one of said at least two polyvinyl alcohols possesses a viscosity at 20° C. of from 4 to 18 mPa*s.

20. The aqueous vinyl ester copolymer dispersion of claim 1, wherein the amount of said at least one emulsifier is from 0.05% to 1.5% by weight, based on the total amount of monomers employed.

21. An aqueous vinyl ester copolymer dispersion stabilized with at least one protective colloid combined with at least one emulsifier, said protective colloid is a mixture two polyvinyl alcohols having different molecular weights, and said dispersion having a viscosity of less than 8000 mPa*s, a weight average $d_w$ of the particle sizes of 0.5 to 10 µm, and a ratio of weight average to number average of the particle sizes, $d_w/d_n$, in the range of from 4.5 to 20.0, wherein said copolymer possesses a glass transition temperature of between −30 and 15° C., wherein said at least one emulsifier is selected from the group consisting of ethoxylated, non-ionic emulsifiers, ethoxylated, anionic emulsifiers, or combinations thereof and wherein an aqueous solution of at least one of said at least two polyvinyl alcohols possesses a viscosity at 20° C. of from 18 to 60 mPa*s and an aqueous solution of at least one of said at least two polyvinyl alcohols possesses a viscosity at 20° C. of from 2 to 18 mPa*s.

22. A process comprising the step of applying an adhesive through a nozzle to a substrate, wherein said adhesive comprises an aqueous vinyl ester copolymer dispersion stabilized with at least two polyvinyl alcohols having different molecular weights combined with from 0.05% to 5% by weight, based on the total amount of monomers employed, of at least one emulsifier, said dispersion having a viscosity of less than 8000 mPa*s, a weight average $d_w$ of the particle sizes of 0.5 to 10 µm, and a ratio of weight average to number average of the particle sizes, $d_w/d_n$, in the range of from 2.5 to 20.0, wherein said copolymer possesses a glass transition temperature of from −20 to +5° C. and wherein an aqueous solution of at least one of said at least two polyvinyl alcohols possesses a viscosity at 20° C. of from 18 to 60 mPa*s and an aqueous solution of at least one of said at least two polyvinyl alcohols possesses a viscosity at 20° C. of from 2 to 18 mPa*s.

23. A process comprising the step of applying an adhesive through a nozzle to a substrate, wherein said adhesive comprises an aqueous vinyl ester copolymer dispersion stabilized with at least two polyvinyl alcohols having different molecular weights combined with from 0.05% to 5% by weight, based on the total amount of monomers employed, of at least one emulsifier, said dispersion having a viscosity of less than 8000 mPa*s, a weight average $d_w$ of the particle sizes of 0.5 to 10 µm, and a ratio of weight average to number average of the particle sizes, $d_w/d_n$, in the range of from 2.5 to 20.0, wherein said copolymer possesses a glass transition temperature of from −20 to +5° C.

24. The process of claim 23, wherein said substrate is hydrophobic.

25. The process of claim 23, wherein the application of the adhesive to the substrate is dotwise or linear.

26. The process of claim 23, wherein said substrate is bonding paper used in the production-line fabrication of folding boxes, envelopes, brochures, or cigarettes.

27. The process as claimed in claim 1, wherein said at least two polyvinyl alcohols each have a degree of hydrolysis of from 70 to 100 mol %.

* * * * *